Feb. 5, 1929.
C. SORENSEN
1,701,280
AGITATING DRAG
Filed May 4, 1927
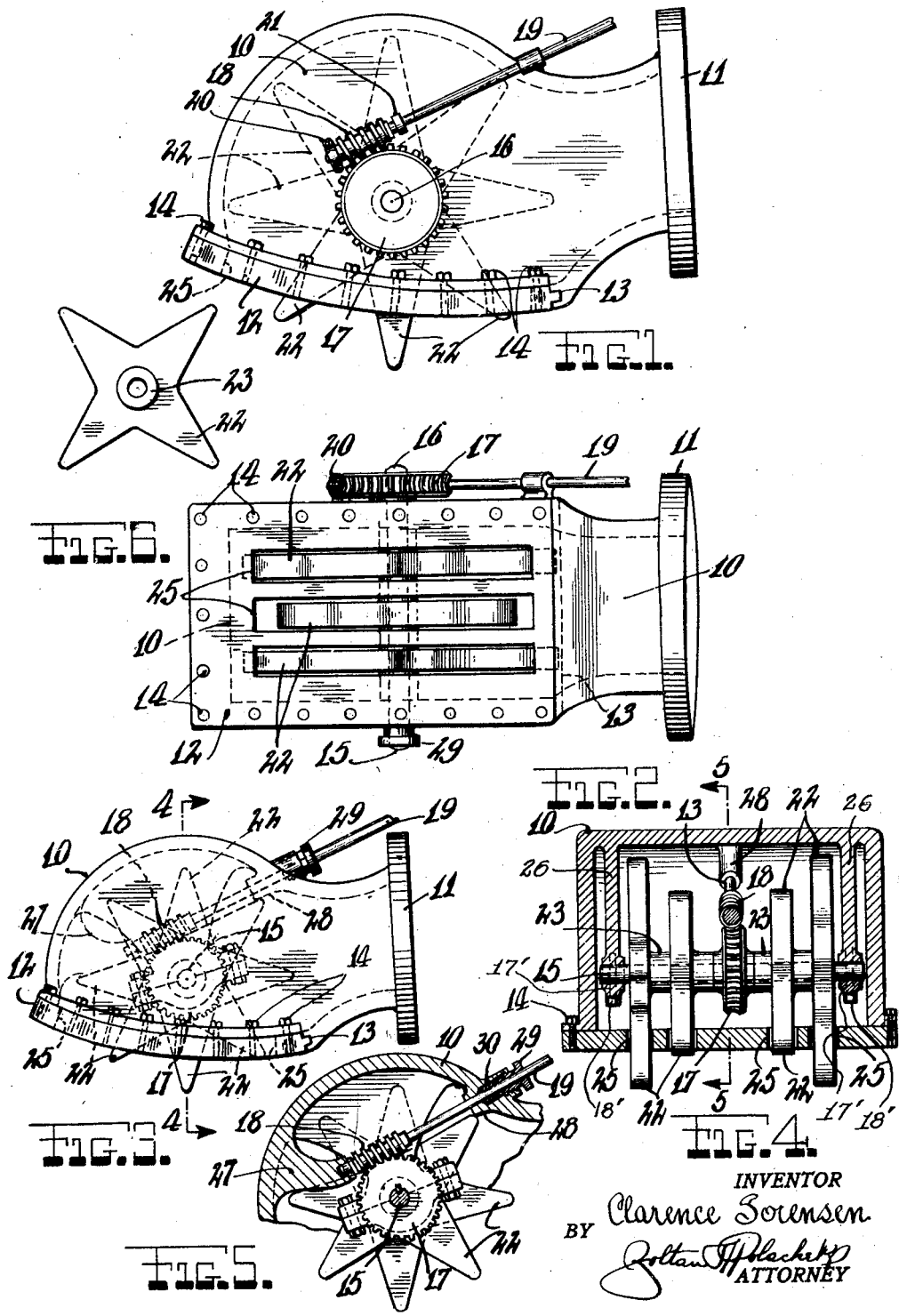
INVENTOR
Clarence Sorensen
BY
Zoltan H Polachek
ATTORNEY Patented Feb. 5, 1929.

1,701,280

UNITED STATES PATENT OFFICE.

CLARENCE SORENSEN, OF BROOKLYN, NEW YORK, ASSIGNOR OF ONE-HALF TO HARRY L. HORN.

AGITATING DRAG.

Application filed May 4, 1927. Serial No. 188,657.

This invention relates to a new and useful device in the nature of an agitating drag for use in connection with dredging river beds, ship channels, and the like, also in connection with hydrostatic mining when removing sand and gravel.

The object of the invention is to provide a drag comprising a means of agitating or loosening the sand and gravel so as to expedite the dredging and removal thereof.

A further object of the invention is to provide an agitating drag of novel construction and arrangement of parts, hereinafter more fully described, claimed, and illustrated in the accompanying drawing.

Fig. 1 is a side elevational view of my improved agitating drag.

Fig. 2 is a bottom plan view thereof.

Fig. 3 is a similar view to that shown in Fig. 1, illustrating a modification of my improved device.

Fig. 4 is a vertical sectional view taken on the line 4—4 of Fig. 3.

Fig. 5 is a similar sectional view taken on the line 5—5 of Fig. 4.

Fig. 6 is a face view of one of the star wheels.

As here embodied my improved device, comprises a drag proper 10, of hollow construction provided with a flanged element 11 as a means of removably attaching same to the pipe line, not shown in the accompanying drawing, such as usually employed in dredging and which is attached to a suction pump for the purpose as hereinafter set forth.

The drag proper 10 is provided with a lower open end adapted to be enclosed or covered by the drag cover 12. The drag cover 12 is provided with an extended element 13 or tongue, adapted to slidably engage in a similar shaped recess formed in the lower portion of the drag proper 10. The bolts 14 are provided as a means of removably securing the drag cover 12 to the lower portion of the drag proper 10 in conjunction with the above mentioned tongue.

The shaft 15 is rotatively mounted in the drag proper 10 and extends at one side thereof as at 16. The worm gear 17 is attached to the extended portion 16 of the shaft 15 and meshes with the worm 18 attached to the shaft 19, rotatively mounted in the extended elements 20 and 21 of the drag proper 10.

The star wheels 22 are attached to the shaft 15 and are positioned inside the drag proper 10. Suitable washers 23, spacers, or collars are placed on the shaft 15 intermediate the star wheels 22, and the inside of the drag proper 10 as a means of retaining the star wheels 22 in the proper position on the said shaft 15, so as to permit the said star wheel to extend somewhat through the elongated apertures 25, formed in the drag cover 12.

The shaft 19 is attached by means of a flexible member to an electric motor or any desired prime mover, so as to rotate the star wheels 22. The latter mentioned elements are not shown in the accompanying drawing.

The above described construction is such as will permit sand and gravel to be agitated by the extended portions of the star wheels 22 so as to permit the suction effected by the heretofore mentioned suction pump to more readily and easily remove the said sand and gravel which is drawn up through the said pipe line and deposited in any desired place.

In Figs. 3 and 4, and 5 of the accompanying drawing, I have shown the said shaft 15 rotatively mounted in the extended elements 26 of the drag proper 10 and in the bearing caps 17' removably secured thereto as at 18' by bolts, studs, or the like. The shaft 15 is positioned inside the drag member 10.

The said worm gear 17 is secured to the central portion of the shaft 15. The shaft 19 is rotatively mounted in the inwardly extended elements 27 and 28 of the drag proper 10 and extended outwardly therefrom at one side thereof. The usual packing gland 29 is provided to retain suitable packing 30 in contact with the shaft 19, so as to prevent the leaking of the said suction at this point. It should be understood that similar construction is provided for the shaft 15 in Fig. 2 for the same purpose.

Having thus described my invention what I claim as new and desire to protect by Letters Patent of the United States is as follows:

1. In a device of the class described, a drag proper, a drag cover removably attached thereto, star wheels attached to a shaft rotatively mounted in the said drag proper, a worm gear attached to the central portion of the said shaft, a worm adapted to mesh with the said worm gear, said worm attached to a second shaft rotatively mounted in inwardly extended elements of the said drag proper, said second shaft extended through one side of the said drag proper.

2. In a device of the class described, a drag body, a shaft transversely mounted therein for supporting star wheels, a worm gear secured to the shaft, a pair of inwardly extending elements projecting from the drag body, a longitudinal inclined shaft rotatively mounted in the inwardly extending elements, and a worm pinion secured to the latter mentioned shaft, and meshing with the said worm gear, as a means for transmitting rotation to the shaft supporting the star wheels of the device.

3. In a device of the class described, a drag body, a shaft transversely mounted therein for supporting star wheels, a worm gear secured to the shaft, a pair of inwardly extending elements projecting from the drag body, a longitudinal inclined shaft rotatively mounted in the inwardly extending elements, and completely passing thru one of these elements so as to extend to the outer side of the drag body, and a worm pinion secured to the latter mentioned shaft, and meshing with the said worm gear, as a means for transmitting rotation to the shaft supporting the star wheels of the device.

4. In a drag of the class described, a housing comprising a bottom member having spaced apart slots therein, a shaft journaled in said housing disposed substantially perpendicular to the length of said slots, and star wheels mounted on said shaft adapted to rotate therewith comprising pointed extensions adapted to extend through said slots and beyond said housing for agitating the surface therebelow.

5. In a drag of the class described, a housing comprising a bottom member having spaced apart slots therein, a shaft journally mounted in said housing, agitating members mounted on said shaft each in registration with one of the slots of said bottom member, and projections on said agitating members radiating therefrom, the projections of each of said agitating members being arranged in staggered relation to the projections of the other agitating members for permitting a single projection to be extended its full length beyond said housing at a time.

In testimony whereof I have affixed my signature.

CLARENCE SORENSEN.